W. F. LITTLE.
AUTOMOBILE HEADLAMP.
APPLICATION FILED FEB. 26, 1921.

1,415,373.

Patented May 9, 1922.

W. F. LITTLE.
AUTOMOBILE HEADLAMP.
APPLICATION FILED FEB. 26, 1921.

1,415,373.

Patented May 9, 1922.
4 SHEETS—SHEET 2.

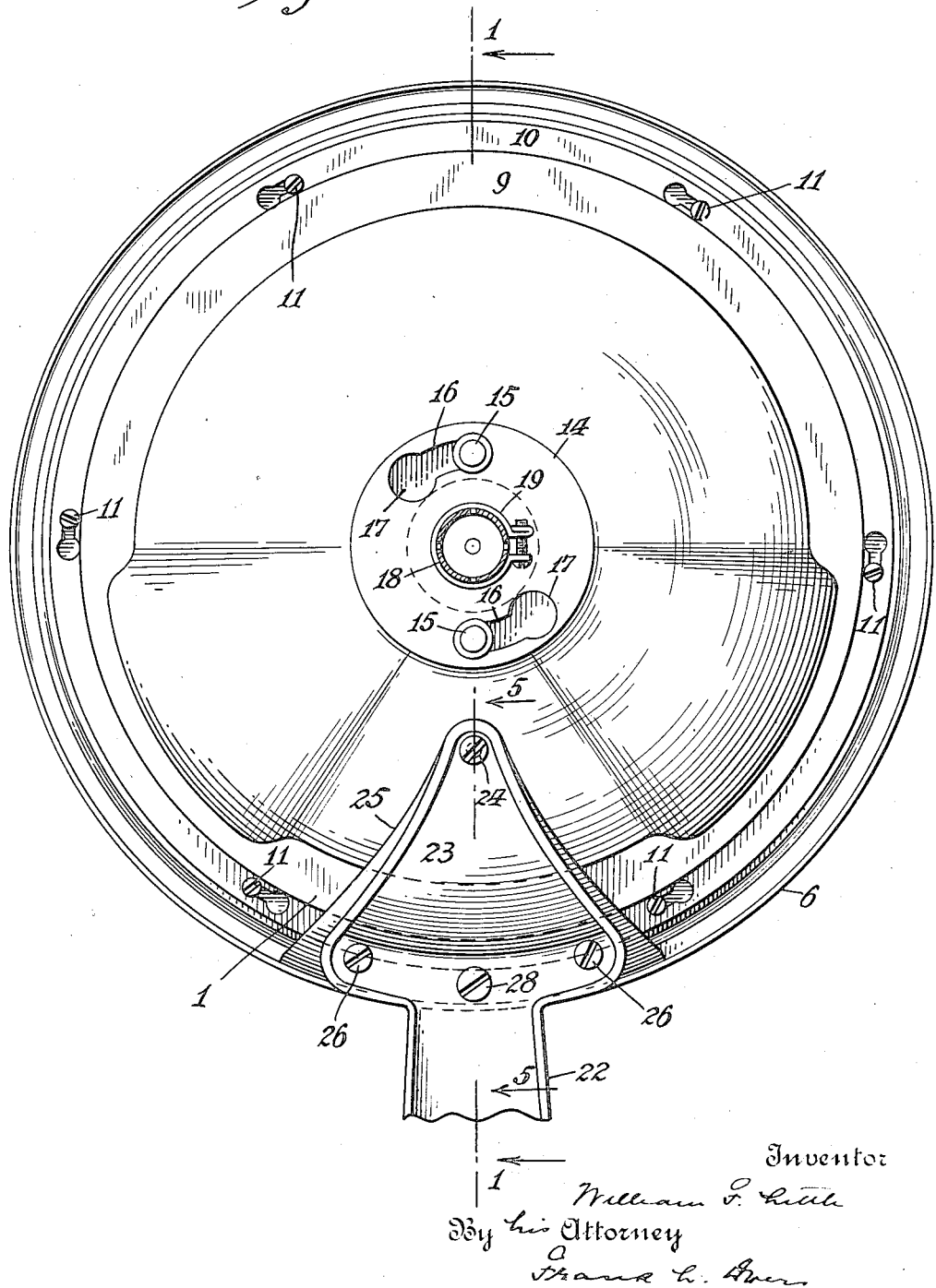

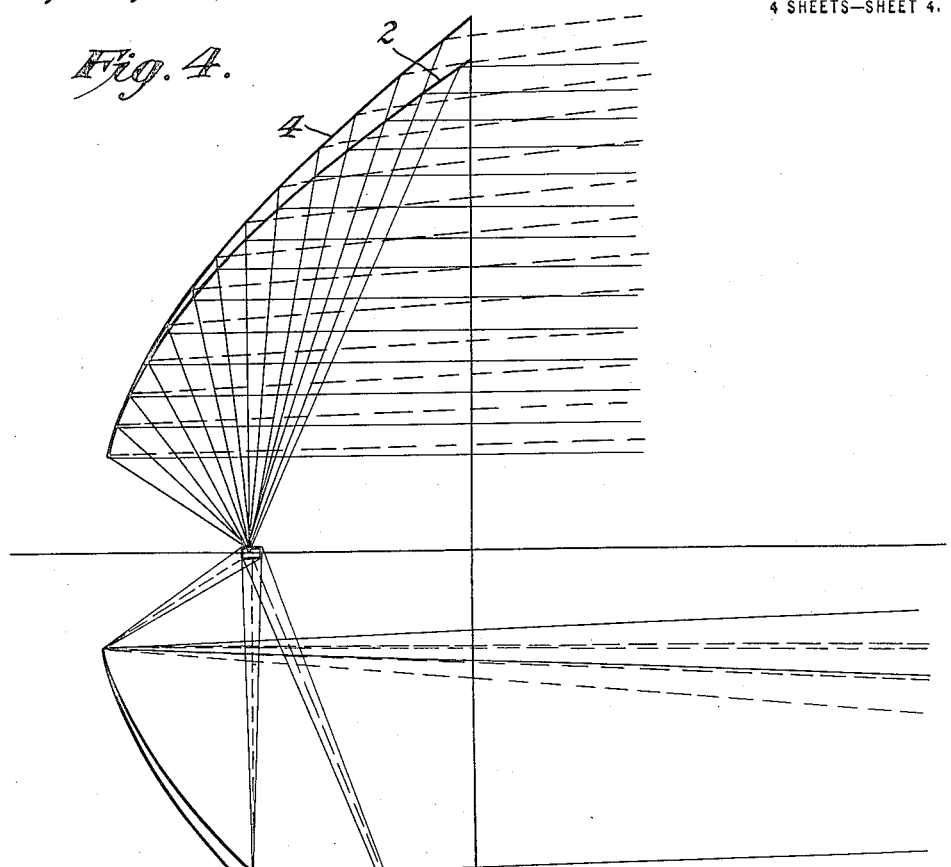
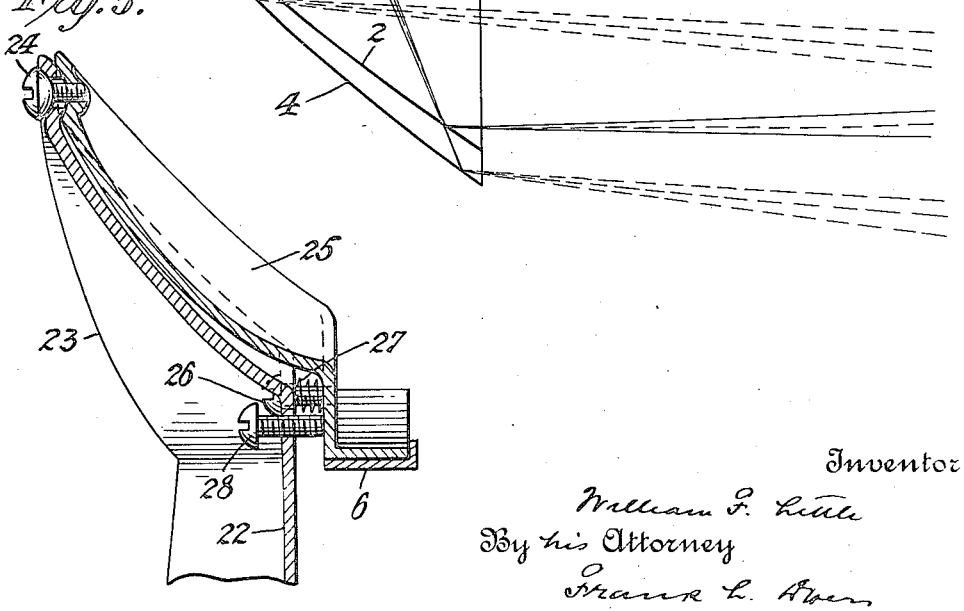

UNITED STATES PATENT OFFICE.

WILLIAM F. LITTLE, OF NEPPERHAN HEIGHTS, NEW YORK, ASSIGNOR TO MARY VIRGINIA WINES LITTLE, OF NEPPERHAN HEIGHTS, NEW YORK.

AUTOMOBILE HEADLAMP.

1,415,373.  Specification of Letters Patent.  Patented May 9, 1922.

Application filed February 26, 1921. Serial No. 447,980.

*To all whom it may concern:*

Be it known that I, WILLIAM F. LITTLE, a citizen of the United States, residing at Nepperhan Heights, county of Westchester, State of New York, (P. O. address 75 Grand View Avenue, Nepperhan Heights, N. Y.,) have invented certain new and useful Improvements in Automobile Headlamps, of which the following is a full, clear, and exact specification.

My invention relates to various new and useful improvements in automobile head lamps and my object is to provide a head lamp of novel construction and operation, as will be more fully pointed out and claimed.

My improved head lamp is based upon the result of a very extended series of investigations relating generally to the problem of road illumination, my desire being to provide maximum illumination in directions and at points where it will be most effective for the driver and at the same time reduce to the minimum the effect of glare in the eyes of the driver of an approaching car.

Generally speaking, the head light problem resolves itself into two features: first, enough road light effectively placed and directed for safe driving, and second, not too much light above the road to cause dangerous glare.

It is not possible to have any light without some glare; the problem resolves itself into a compromise. On a dark country road, an ordinary hand lantern of from 5 to 10 c. p. may cause blinding glare if it is held near and in the line of vision of the observer. The very minimum candle-power value as produced by automobile head lamps is far in excess of that from a hand lantern, and hence the necessity for accurate control is obvious.

As most head light laws require that substantial objects must be visible at a distance of 200 feet directly ahead of the car, it is essential that sufficient light be projected between road level and lamp level to discern such an object, and road level at this distance is one degree below the horizontal. Furthermore, safety requires that at least a width of 15 feet of the road must be visible at all times at a distance of from 40 to 200 feet.

I have found as a result of many experiments with a large number of observers from all walks of life that at a distance of 100 feet any candle power in excess of 800 received in the eyes results in dangerous glare, which, like intensity, varies inversely as the square of the distance. The same experiments have shown that to reveal a substantial object under average conditions at a distance of 200 feet requires at least a candle power in the neighborhood of 5,000, although 10,000 is better.

Bearing these two observations in mind it will be seen that head lamp beams which will fulfill requirements must have a combined cross-section such that, at an angle of one-half degree above horizontal at a position parallel to and between the lamp axes, and corresponding to eye level at 200 feet, the candle power must not exceed 3200; and at a position four degrees to the left of this point and one degree above horizontal, corresponding to eye level at 100 head and 7 feet to left, the candle power must not exceed 800. At a position between horizontal and one degree below horizontal, corresponding to horizontal and road level at 200 feet, the candle power should have its maximum value, say 10,000. At positions four degrees to the right and left of this median plane between horizontal and two degrees below horizontal, corresponding to road level at 100 feet, the candle power should exceed 2400 for satisfactory illumination; and at a position corresponding to the ditch at the side of the road 50 feet ahead, that is to say, approximately six degrees to the right and four degrees below the horizontal, the candle power should exceed 600.

From the driver's seat the road appears as a triangle with the apex at horizontal and the lower vertices corresponding to the road sides immediately in front of the car, with the lower and central portion of the triangle eclipsed by the car hood. Under normal driving conditions at reasonable speed, say 20 to 25 miles per hour, any portion of the road nearer than 40 feet need not be illuminated as anything within this region, if in the path of the car, cannot be avoided. A beam cross section conforming to this general shape and which I produce by the improvements to be described, with a high center portion near the horizontal, tapering off gradually toward the vertices of the triangle, not only provides an advantageous distribution for driving light, but also keeps high intensities and resultant glare out of the range of the eyes of the approaching driver. Even on hilly and curved roads the effect due to glare is less annoying than with a flat top beam.

With my improvements I do away entirely with separate lenses, and secure the desired beam modification by reason of the design of the reflector, and I so assemble the lamp that the reflector can be accurately aimed, and the lamp filament accurately positioned in the reflector axis, since satisfactory results cannot be obtained with the lamp filament out of alignment or improperly focused. In order that the invention may be better understood, attention is directed to the accompanying drawings, forming part of this specification, and in which:

Fig. 3 is a vertical cross section on the line 3—3 of Fig. 1;

Fig. 4 is a diagram illustrating (above) the reflection of light rays from a point source by means of paraboloidal and hyperboloidal surfaces and (below) the reflections of rays from a filament as a source by such surfaces; and Fig. 5 is a detail section on the line 5—5 of Fig. 3.

In the above views, corresponding parts are represented by the same numerals.

With my improved head lamp the reflector 1 is stamped or otherwise formed of metal, suitably silvered to provide the desirable reflecting surface, and is provided with both paraboloidal and hyperboloidal sections, the latter being provided with a relatively long transverse axis to produce the desired distribution. As indicated, the upper 180° and the lower 60° are paraboloidal, these sections being indicated as 2 and 3 respectively. The remaining sections 4 and 5 are hyperboloidal. In other words, with the proportions shown two-thirds of the reflecting surface and one-third thereof are, respectively, paraboloidal and hyperboloidal, neglecting the portions of the reflector where the change from one surface to the other is accomplished, although it will be understood that these proportions may be varied if desired. The two paraboloidal sections produce conical beams of approximately three degrees in diameter, while the hyperboloidal sections distribute the light evenly in bands about seven degrees wide, extending from the high center point downwardly and outwardly at an angle of 60° to the vertical.

The light distribution from the two parts of the reflector is shown in Fig. 4, where the outer curved line 4 represents the hyperboloidal surface and the inner curved line 2 represents the paraboloidal surface. The upper part of Fig. 4 shows the distribution from a point source, the broken lines diverging as they would be projected from a hyperboloidal surface having a transverse axis equal to 28 inches and a conjugate axis equal to approximately 12 inches. The solid lines are the rays as they would be distributed from a paraboloid having a one and one-quarter inch focal length. The lower part of Fig. 4 shows the light cones as they would be projected from the same two surfaces with a lamp filament as the source. The paraboloid and hyperboloid are both surfaces of revolution produced by the revolution of a parabola and a hyperbola. Both of these curves are conic sections, and the hyperbola with an infinite transverse axis becomes a parabola. Light rays radiating from a point source in the focus of a paraboloid are projected parallel with each other. Light rays radiating from a point source in the focus of a hyperboloid are projected divergently as if the light source were placed in the opposite focus. Therefore to procure a predetermined spread of light from a hyperboloid it is only necessary to substitute the proper values in the equation of the hyperbola.

Figure 1:
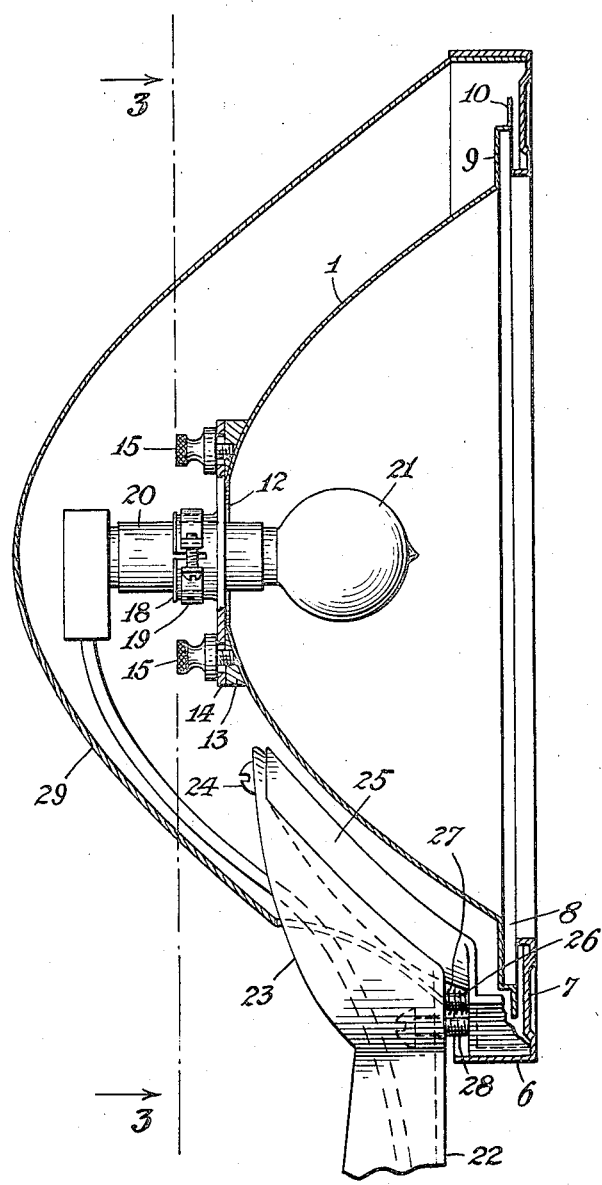
Fig. 1 is a central vertical section, partly in elevation, on the line 1—1 of Fig. 3.
Figure 2:
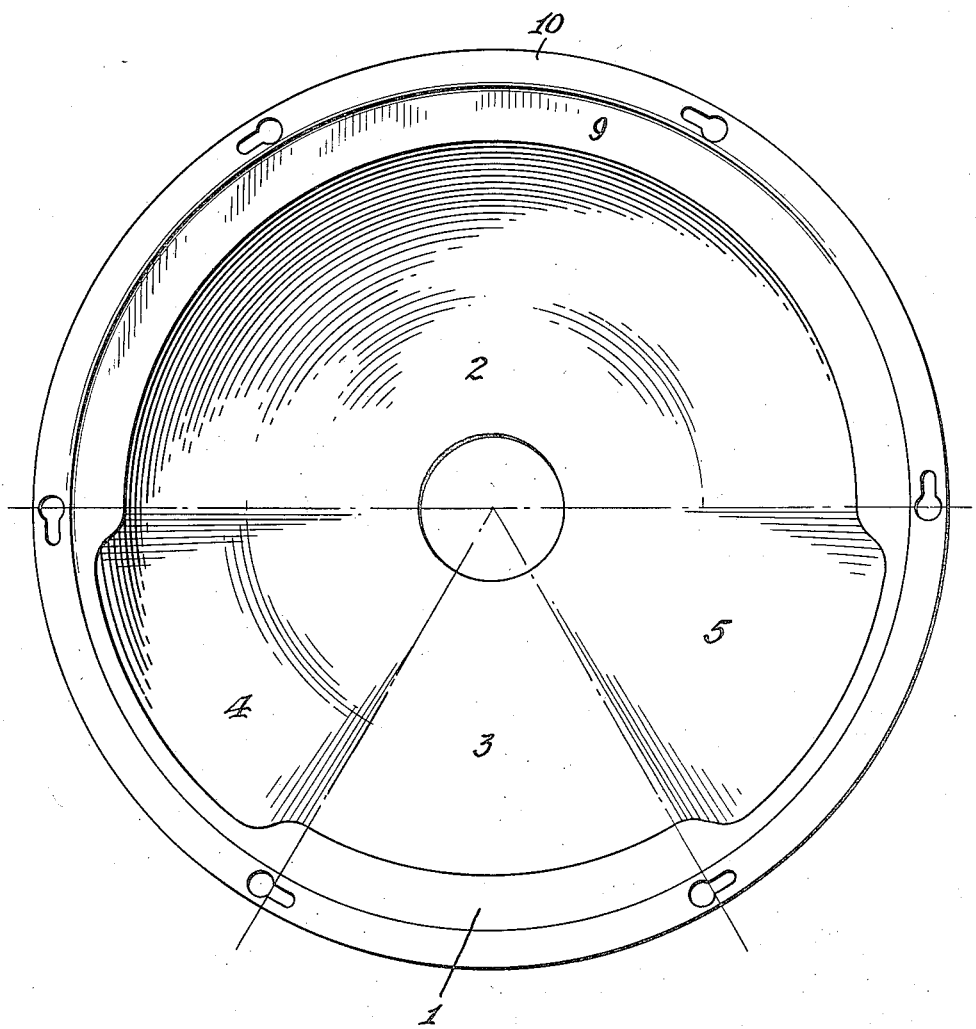
Fig. 2 is a front elevation of the reflector.

A silvered reflector, exposed to the elements, soon loses its lustre and reflecting value, while the relamping of a bulb usually results in finger prints on the reflector which also reduces its reflecting value. Therefore with my improved head lamp I arrange the reflector so that it will be protected from the elements, and I perform the relamping through the rear. The main frame 6 is usually circular, and is formed with a rim 7 against which the front glass 8 is seated. The reflector 1 is formed with a seating portion 9 for receiving, supporting and centering the glass 8, and with a rim 10 by which the reflector is tightly clamped to the rim 7 by screws 11, as shown in Fig. 3. This forms a stiff and strong construction and effectively protects the reflector from exposure. The reflector at its back is formed with a hole 12 which need not be larger than one and one-half inches in diameter, and therefore there will be but little loss of reflecting surface. Secured to the back of the reflector and surrounding the hole 12 is a frame 13, upon which is mounted a plate 14 held in position by clamping screws 15. The slots 16 are wider than the shanks of the screws 15, thus permitting the plate 14 to be adjusted vertically and horizontally to bring the lamp filament in proper alignment, and the openings 17 are larger than the heads of the screws 15 to permit the plate to be taken off for relampment. The plate 14 is formed with a split sleeve 18 (Figs. 1 and 3) and surrounding the sleeve is a clamping band 19, so that after the socket 20 is properly rotated and moved back or forth to bring the center of the filament of lamp 21 at the reflector focus, the clamping band 19 may be tightened to lock the socket firmly in place. Of course other means may be employed to permit this adjustment of the lamp filament.

In order to properly and accurately aim the device I employ a three-point suspension, which permits of delicate adjustment and offers rigid support. The supporting bracket 22 is formed with a triangular head 23, the apex of which is connected by a screw 24 to the member 25 so as to permit of limited universal movement between the parts 23 and 25. Screws 26 in the member 25 pass through holes in the head 23, a light spring 27 on the shank of such screws keeping the parts separated, and a single screw 28 in the bracket 22 engaging the member 25 (Fig. 5), and locking the parts rigidly after the aiming has been effected by adjusting the screws 26, as will be understood. The member 25 is rigidly secured to the main frame 6.

The rear housing 29 is removably secured to the frame 6 and will be removed when it it necessary to replenish or adjust the lamp 21.

The front glass 8 may be clear window glass, either convex or flat, or it may be a molded disk of glass. Any reflector without a glass front will tend to project streaks in the beam cross section for the reason that the beam is made up of an infinite number of images of the lamp filament. Hence a molded glass disk is preferred because it is not so perfect as window glass and tends to break up the streaks referred to and produce a beam with a smooth cross-section.

In the foregoing I have referred to certain distances, angles, dimensions, speeds, and so forth. These are based on present automobile practice and operation. It will be understood that as such practice changes the respective factors embodied in the lamp will be varied to meet the new conditions.

Having now described my invention, what I claim as new therein and desire to secure by Letters Patent, is:

1. A reflector for automobile head lamps, having a section for producing a concentrated light beam around the axis of the reflector, and a hyperboloidal section having the same axis and focus as the first mentioned section and arranged angularly with respect to the vertical for producing an oblique beam or band of general illumination merging with said concentrated light beam and extending downwards and outwards to illuminate the side of the road, substantially as set forth.

2. A reflector for automobile head lamps having a paraboloidal section for producing a concentrated light beam around the axis of the reflector, and a hyperboloidal section having the same axis and focus as said paraboloidal section and arranged angularly with respect to the vertical for producing an oblique beam or band of general illumination merged with the paraboloidal beam and extending downwards and outwards to illuminate the side of the road, substantially as set forth.

3. A reflector for automobile head lamps having a paraboloidal section for producing a concentrated light beam around the axis of the reflector, and two hyperboloidal sections arranged angularly with respect to the vertical for producing two oblique beams or bands of general illumination, both merging with the paraboloidal beam and extending downwards and outwards to illuminate the sides of the road, all three of said sections having the same focus and axis, substantially as set forth.

4. A reflector for automobile head lamps having a paraboloidal section for producing a concentrated light beam around the axis of the reflector, two hyperboloidal sections arranged angularly with respect to the vertical for producing two oblique beams or bands of general illumination, both merging with the paraboloidal beam and extending downwards and outwards to illuminate the sides of the road, and a paraboloidal section supplying a concentrated light beam between the two diverging hyperboloidal beams, all of said sections having the same focus and axis, substantially as set forth.

5. In an automobile head lamp the combination with a frame, a front glass and a reflector secured together, of a lamp removable from the rear and carried within the reflector, a plate supporting said lamp and within which the lamp is adjustable longitudinally, and means for adjusting said plate vertically and horizontally, whereby the lamp will be capable of universal adjustment with respect to the reflector, substantially as set forth.

6. In an automobile head lamp, the combination of a lamp structure, a triangular member thereon, a supporting bracket having a triangular head, a universal connection between the apices of the triangular parts, adjusting screws at the vertices of the triangular parts, and a locking screw for rigidly maintaining the adjustment of the triangular parts, substantially as set forth.

This specification signed and witnessed this 21st day of February, 1921.

WILLIAM F. LITTLE.

Witnesses:
CHARLES C. MARSHALL,
M. JONES.